United States Patent [19]
Hendry

[11] 3,804,411
[45] Apr. 16, 1974

[54] BALL HAVING INTERNAL LIGHTING SYSTEM

[76] Inventor: Robert S. Hendry, 19 Hillside Ave., North Haledon, N.J. 07508

[22] Filed: Feb. 5, 1973

[21] Appl. No.: 329,732

[52] U.S. Cl............ 273/58 G, 46/228, 273/DIG. 24
[51] Int. Cl............................................. A63b 71/02
[58] Field of Search ..... 273/DIG. 24, 58 G; 46/228; 213/DIG. 5

[56] References Cited
UNITED STATES PATENTS

| | | | |
|---|---|---|---|
| 3,580,575 | 5/1971 | Speeth | 273/58 G |
| 3,304,651 | 2/1967 | Deyerl | 273/58 G |
| 3,458,205 | 7/1969 | Smith | 273/58 G |
| 3,521,886 | 7/1970 | Bosco | 273/58 G |
| 2,849,819 | 9/1958 | Murphy | 273/58 G |
| 716,645 | 12/1902 | Ransom | 273/DIG. 24 |
| 2,874,964 | 2/1959 | Edwards | 273/DIG. 5 |

FOREIGN PATENTS OR APPLICATIONS

| | | | |
|---|---|---|---|
| 529,271 | 11/1940 | Great Britain | 273/58 G |

*Primary Examiner*—Richard C. Pinkham
*Assistant Examiner*—Marvin Siskind
*Attorney, Agent, or Firm*—James J. Cannon, Jr.; James J. Cannon

[57] ABSTRACT

This invention pertains to an educational toy called a comet ball which may be utilized in many games involving both skill and chance. The comet ball comprises a plastic ball having a source of interior illumination and having designed on its surface small areas through which light shines brightly. These areas are designed in patterns representing constellations of celestial bodies. The remaining surface of the comet ball may be of different colors of plastic having some light permeability. Games utilizing the comet ball may be based upon the astronomical models incorporated in the ball or the illuminated colors of a set of comet balls. The ball is formed of two hemisphere secured together. A hollow cylindrical tube is attached internally to each of the sphere. The tubes are threaded and can be screwed together to tightly secure the hemispheres. Inside the tube is placed a battery which supplies power to light a bulb also located interiorly of the sphere.

3 Claims, 1 Drawing Figure

PATENTED APR 16 1974        3,804,411
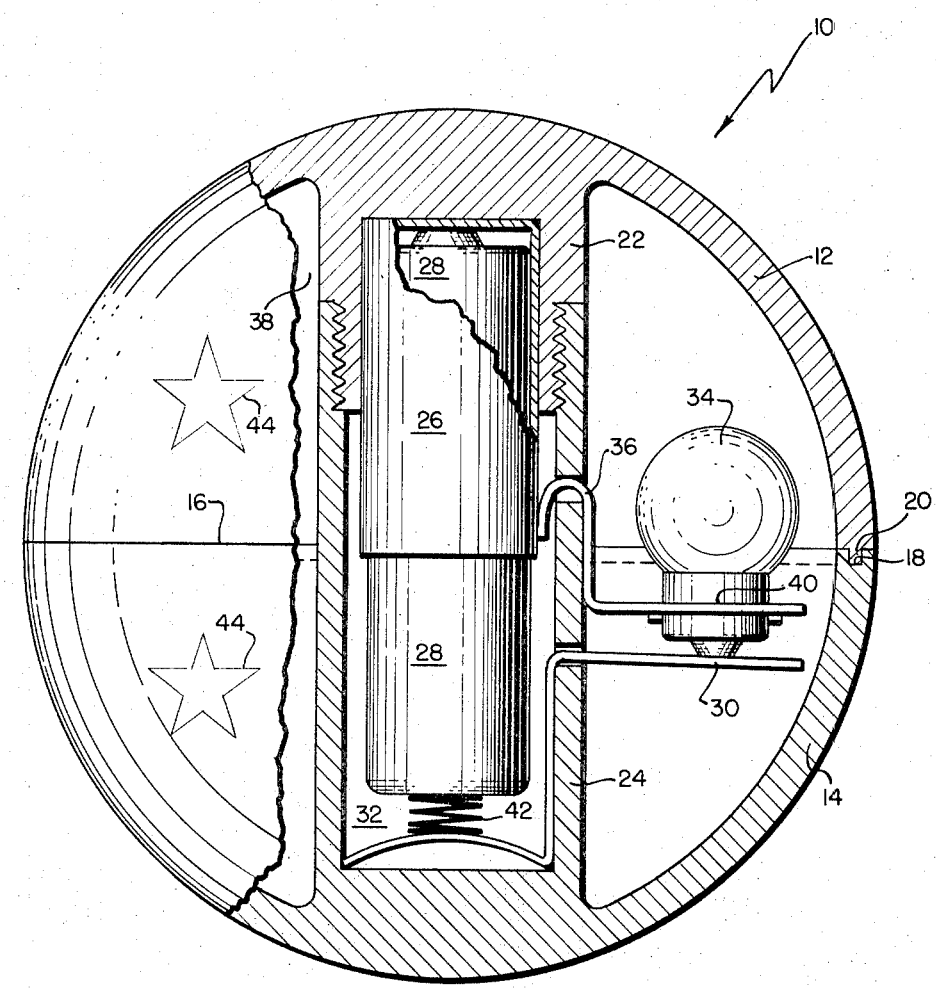

BALL HAVING INTERNAL LIGHTING SYSTEM

BACKGROUND OF THE INVENTION

1. Field of the Invention

Class 273, subclasses 1, 89, 93, 95 and 100.

Class 35, subclasses 45, 47.

This invention pertains to an educational toy called a comet ball which may be utilized in numerous games involving both skill and chance. It comprises a plastic ball having a source of interior illumination and having designed on its surface small areas through which light shines brightly. These areas are designed in patterns resembling certain groups of celestial bodies or constellations of stars. The comet ball may be constructed of different color plastics and is of a rugged construction so that it may be pitched back and forth. Games utilizing the comet ball may be based on either the astronomical models incorporated in a set of comet balls or on the illuminated colors of a set of these balls.

2. Description of the Prior Art

The prior art discloses numerous U.S. Pats. involving balls and games based on balls. It also discloses numerous games based on color recognition. U.S. Pat. No. 3,231,278 discloses one game based on color-coded balls.

The use of various spherical shaped devices to model the universe or portions of the universe for educational, instructional or even amusement purposes is well known in the art. U.S. Pat. No. 2,382,643 teaches a device for simulating the starlit sky with a means to indicate the positions of the stars at various times. U.S. Pat. Nos. 3,303,582 and 3,520,073 both teach a form of terrestrial and celestial display apparatus for displaying and projecting information concerning celestial bodies and the earth on a viewing surface. Both the latter two devices and, to a lesser degree the earlier device, are relatively complex educational and scientific mechanisms.

The prior art fails to disclose any educational game or toy based on color coded astronomical spheres such as the disclosure of the present invention. It also does not disclose any balls or games based on balls having a source of interior illumination.

The present invention differs from the prior art in that it involves primarily a relatively simple educational toy and game rather than a complex educational device. This invention in its game form uses up to six illuminated comet balls, each of which may contain representations of different constellations of stars and each of which is a different color. In line with its very different purposes and uses, the comet balls of this invention are relatively simple and durable in structure since they will be tossed about in playing the game. Nothing similar has been found in the prior art.

SUMMARY OF THE INVENTION

This invention pertains to an educational toy which may be utilized in various games involving skill and chance. A device in accordance with this invention incorporates a hollow sphere of thin wall construction on which representations of various constellations of stars are placed and containing within said sphere a source of illumination such as a standard flashlight battery and bulb. When the sphere is lighted the representations of the stars will permit the passage of light outwards such that an image of the star pattern or constellation may be projected on a wall. Since the device of this invention is relatively small in size, only a small fraction of the stars of the universe may be represented on any one spherical comet ball. Games utilizing this device are based on the use of six such comet balls distinguished by color and/or by star patterns. Celestial identification games may be played in a darkened room with a set of different comet balls. Another game involves the use of an internally illuminated translucent stake as a target and tossing or pitching the comet balls toward the stake. Scoring is based on proximity of the tossed comet ball to the illuminated stake. The comet balls may also be used in a game of catch and, if played at night, the illuminated balls will look like comets. The comet ball is also designed to be watertight and may be used in pool games. For smaller children it may be used to develop physical coordination and color recognition.

It is the principal object of this invention to provide an illuminated comet ball which models constellations of stars and may be used in various games.

It is a further object of this invention to provide games utilizing the comet ball based on its illumination and the star patterns on the ball.

It is a further object of this invention to provide illuminated colored comet balls for use in various games based on the colors and/or the star patterns of the balls.

It is still a further object of this invention to provide an illuminated comet ball for use in games which can be played indoors and outdoors in the dark based on the illuminated characteristics of the comet ball.

Other objects, features and advantages will become apparent from the following description read in conjunction with the accompanying drawings.

BRIEF DESCRIPTION OF THE DRAWINGS

FIG. 1 is a perspective view of the comet ball of this invention partially broken away to illustrate certain features thereof.

DESCRIPTION OF THE PREFERRED EMBODIMENT

Referring now to the drawing wherein the reference numeral 10 denotes generally the comet ball of the present invention, ball 10 is a generally hollow sphere which comprises two hemispheres, an upper hemisphere 12 and a lower hemisphere 14 which abut each other at mid-line 16. The perimeter edge of lower sphere 14 has a groove 18 to receive a tongue 20 on the perimeter edge of upper hemisphere 12, in order to provide for frictional securement of the hemispheres in the assembled, abutting relationship. This also provides a water-tight assembly when comet ball 10 is used in outdoor games and/or in swimming pools.

Each of the hemispheres 12, 14 is of thin wall construction and is so constructed that the thin wall is darkened and has a predetermined light permeability characteristic. In accordance with the present invention, a plurality of comet balls 10, usually six, are used in the various games. The various comet balls 10 are distinguished by the color of the substance used to darken the exterior or interior of the thin walls of hemispheres 12, 14, such substances and colors being chosen so that when a source of illumination is placed within a comet ball 10, the ball will appear to be red, green, blue, yellow, orange or white, or other suitable colors.

The materials used to manufacture comet ball 10 should be a relatively rigid and durable plastic material which will have the translucent properties necessary to allow light to permeate or project outwards. The materials should be durable enough for comet ball 10 to be tossed about without losing its shape and color and without destroying its source of interior illumination. In size, comet ball 10 would normally be slightly larger than an ordinary soft ball. However, any size is acceptable as long as it can accomodate an interior source of illumination and be thrown by a person.

Comet ball 10 is provided with an interior source of illumination and a means for holding said interior source of illumination in position. This means includes a hollow cylindrical tube 22 integrally formed with the upper hemisphere 12 and projecting inward about two thirds of the distance towards the midpoint of the hemisphere. Tube 22 has molded external threads. A second hollow cylindrical tube 24 is integrally formed with the lower hemisphere 14 and protrudes vertically inward to a point about two-thirds the distance above the midline 16. Tube 24 has molded interior threads. Tubes 22 and 24 are so constructed and threaded that in assembling hemispheres 12 and 14 together in the abutted, assembled relationship, the two interior molded tubes 22 and 24 are screwed together. A hollow cylindrical can 26 made of an electrically conductive metal such as aluminum, open at its lower end, is snugly inserted into tube 22 of upper hemisphere 12 to provide an electrical contact for flashlight batteries 28. Tubes 22 and 24 have an interior diameter such that in the assembled position they will snugly receive and hold in position one or two standard flashlight batteries 28.

A bulb contact 30 is positioned across the interior bottom of tube 24, then extends vertically upwards along the interior side wall of tube 24 to an aperature 32 whence contact 30 extends horizontally outward through said aperature 30 to form a supporting base for holding a bayonet base flashlight bulb 34. A second bulb contact 36 extends horizontally inward from bulb 34 to tube 24 and then vertically upwards to a second aperature 38 in tube 24 at which point it is bent inward through aperture 38 and vertically downward to form a contact with the side of can 26. Bulb contact 36 has a U-shaped cut-out 40 on its horizontal end to receive the stem of bulb 34 and support bulb 34 in electrical contact with the other bulb contact 30.

When comet ball 10 is fully assembled, battery can 26 almost fully surrounds battery 28 and the top of can 26 is in contact with the positive terminal of battery 28. The threads on tubes 22 and 24 are screwed together. The tongue on hemisphere 12 fits snugly within the groove on hemisphere 14. The negative terminal of battery 28 is in contact with bulb contact 30 and battery can 26 is in contact with bulb contact 36. With bulb 34 in position, the electrical circuit is complete and the bulb 34 will be lit. The light may be extinguished by any means of interrupting the electrical circuit such as partially unscrewing hemispheres 12, 14, or by removing bulb 34 or battery 28. A switch to turn the light on and off may be incorporated into the circuit.

A pattern of stars, denoted generally by the reference numeral 44 may be formed on either the interior or exterior surfaces of the hemispheres 12 and 14 by omitting the darkening substance at the points at which stars are desired. These patterns of stars 44 would represent various constellations. At these points the walls of hemispheres 12 and 14 would be translucent, enabling illuminated comet ball 10 to project the patterns onto a wall in a darkened room. In a set of comet balls 10 of the six different colors, the star patterns 44 could be different on each ball so that the set could be used in a star or constellation recognition game. When an illuminated comet ball 10 with a star pattern 44 on its surface is tossed in a darkened environment, it has the appearance of a comet.

An additional feature may be added to comet ball 10 to increase the amusement value of this device. The darkening substance used on hemispheres 12 and 14 may be a substance having the property of illuminescence so that comet ball 10 will glow after the light is extinguished or should fail.

A variety of games may be played with comet ball 10 such as a simple game of catch in a darkened environment. Another game comprises the use of internally illuminated translucent stake which is inserted in the ground or in a stand for indoor use or anchored in a pool. The area about said illuminated stake should form an unobstructed court having a surface of relatively high frictional characteristics such as a lawn or pool. The players of this game position themselves twenty feet from the stake and roll or pitch a comet ball 10 towards the stake. The object of the game is to pitch or roll each ball 10 to a point within a five foot radius of the stake and to further position said balls 10 in a predetermined order of proximity to said stake. A distance marker for measuring distances from the illuminated stake may be required to determine the relative proximity of a comet ball 10 to said illuminated stake. Scoring is based on the successful positioning of a ball in the predetermined order of proximity to the stake. The point values range from 60 for the closest ball to 10 for the furthest ball. The first player to score 1,000 points wins the game. From two to six players may play and they may form teams. For example, consider a game with two players and a predetermined order of proximity of red, green, blue, yellow, orange and white worth 60 to 10 points respectively. In the first round player one rolls three balls, for example, red, blue and orange. Player two rolls the other three, green, yellow and white. If each player, rolling alternately rolled each comet ball to its proper position in the predetermined order of proximity to the stake, player one would score 120 points and player two would score 90 points. On the second round, the players would switch balls and, if they were equally successful in positioning the comet balls on this round, the score would be tied at 210 points each.

The predetermined order of proximity may be selected either on the basis of color or on the basis of the different star patterns on each of the six comet balls. In either case, the game may be played in the evening or in a darkened area since both the comet balls and the stake are illuminated.

Other games may be played with this comet ball such as simple games of catch both in lighted and darkened areas.

Star recognition games may be also played with this comet ball by projecting the patterns of constellations on each comet ball onto a wall in a darkened room.

Thus the comet ball of this invention provides a novel combination of elements which may be used in a variety of games to provide healthful and relaxing recreation for people of all ages. The various advantages and objects of the invention may be accomplished by modifications of the specific embodiment described herein, and it is intended that the appended claims shall include all equivalent arrangements fairly coming within their scope.

I claim:

1. A comet ball for use in games involving the pitching or rolling of said ball comprising in combination:
   a. a substantially hollow sphere comprising two hemispheres one of said hemispheres having an edge having a tongue projecting therefrom, and the edge of the other having a groove therein to receive said tongue in order to provide for a waterproof frictional securement of said hemishperes in the assembled, abutting relationship, said sphere formed of a substantially translucent material having a darkened thin wall with predetermined limited light permeability characteristics such that said wall when lighted from the interior appears to be a glowing ball of some color;
   b. a pattern representing celestial bodies designed on said thin wall by eliminating some of the darkening substance such that, when lighted from the interior, a brighter light will project outward in the form of the design from the non-darkened translucent areas than from the darkened areas;
   c. means supported centrally for a source of illumination within said sphere, said means comprising:
   a hollow cylindrical tube integrally formed internally of one of said hemispheres and having external threads, said tube projecting inwards toward the center of said sphere and being lined with an electrically conductive material, a second hollow cylindrical tube integrally formed with the other of said hemispheres, having internal threads and projecting inwards toward the center of said sphere;

both of said tubes adapted to be screwed together near the center of said sphere and both adapted to receive a standard size of flashlight battery;
   a negative terminal contact which extends along the bottom and one side of said unlined tube and outward through an aperature in said tube to form a supporting base for a bayonet base light bulb within said sphere;
   a positive terminal contact which extends from the conductive liner of the first of said tubes through an aperature in one of said tubes to said bulb also forming a means for supporting said bulb in closed contact with said negative terminal contact;
   a battery tightly held within said tubes whose positive terminal is touching said tube lined with an electrically conductive material and whose negative terminal contacts said negative terminal contact;
   a light bulb held in position within said sphere by said positive and negative terminal contacts to complete an electrical circuit.

2. The comet ball as defined in claim 1 wherein said means supported centrally further comprises:
   a switch on the thin wall of said sphere for controlling a source of illumination.

3. A comet vall as defined in claim 2 wherein the darkening of the thin wall of said sphere is accomplished by coating the interior of said thin walls with a substance having the property of illuminescence so that said comet ball will glow when its light is extinguished.

* * * * *